United States Patent
Thaler et al.

(10) Patent No.: US 9,455,905 B2
(45) Date of Patent: Sep. 27, 2016

(54) ENCAPSULATION FOR LINK LAYER PREEMPTION

(71) Applicant: Broadcom Corporation, Irvine, CA (US)

(72) Inventors: Patricia Ann Thaler, Carmichael, CA (US); Eric John Spada, Groton, MA (US)

(73) Assignee: Broadcom Corporation, Irvine, CA (US)

(*) Notice: Subject to any disclaimer, the term of this patent is extended or adjusted under 35 U.S.C. 154(b) by 122 days.

(21) Appl. No.: 14/187,098

(22) Filed: Feb. 21, 2014

(65) Prior Publication Data

US 2014/0245114 A1    Aug. 28, 2014

Related U.S. Application Data

(60) Provisional application No. 61/768,164, filed on Feb. 22, 2013, provisional application No. 61/774,900, filed on Mar. 8, 2013.

(51) Int. Cl.
*H04L 12/725* (2013.01)
*H04L 1/00* (2006.01)
*H04L 12/703* (2013.01)
*H04L 12/771* (2013.01)

(52) U.S. Cl.
CPC .............. *H04L 45/30* (2013.01); *H04L 1/0041* (2013.01); *H04L 1/0061* (2013.01); *H04L 1/0083* (2013.01); *H04L 45/28* (2013.01)

(58) Field of Classification Search
CPC .... G06F 11/104; G06F 11/10; H04L 1/0061; H04L 45/30; H04L 1/0041; H04L 45/28; H04L 1/0083
See application file for complete search history.

(56) References Cited

U.S. PATENT DOCUMENTS

| | | | |
|---|---|---|---|
| 4,914,535 A * | 4/1990 | Weng | G11B 20/1252 360/49 |
| 5,343,473 A | 8/1994 | Cidon et al. | |
| 5,557,608 A | 9/1996 | Calvignac et al. | |
| 5,568,469 A | 10/1996 | Sherer et al. | |
| 6,795,450 B1 | 9/2004 | Mills et al. | |
| 6,909,723 B1 * | 6/2005 | Yonge, III | H04L 47/10 370/447 |
| 7,346,072 B2 | 3/2008 | Jones et al. | |
| 7,835,290 B2 | 11/2010 | Song et al. | |
| 8,225,187 B1 * | 7/2012 | Schultz | G06F 11/1004 714/807 |

(Continued)

OTHER PUBLICATIONS

Winkel, Distinguished Minimum Latency Traffic in a Converged Traffic Environment, IEEE 802.03 Ethernet Working Group, 77 pgs., Jul. 15, 2013.

*Primary Examiner* — Cynthia Britt
*Assistant Examiner* — Dipakkumar Gandhi
(74) *Attorney, Agent, or Firm* — Brinks Gilson & Lione

(57) ABSTRACT

Devices implement encapsulation to support link layer preemption. The device may include a encapsulation logic that encapsulates data, such as an Ethernet frame, to produce an encapsulated frame. The encapsulated frame may include an encapsulation element that indicates whether the encapsulated data includes non-preemptible data, such as Distinguished Minimum Latency Traffic (DMLT), or preemptible data. The encapsulated frame may also indicate whether the encapsulated data comprises the last fragment of a preemptible frame.

20 Claims, 7 Drawing Sheets

(56) References Cited

U.S. PATENT DOCUMENTS

| | | |
|---|---|---|
| 2002/0087716 A1 | 7/2002 | Mustafa |
| 2003/0099299 A1 | 5/2003 | Rogerson et al. |
| 2004/0100941 A1 | 5/2004 | Lim et al. |
| 2005/0254423 A1 | 11/2005 | Berghoff |
| 2005/0275875 A1 | 12/2005 | Jennings |
| 2005/0281279 A1 | 12/2005 | Dennison et al. |
| 2006/0109864 A1* | 5/2006 | Oksman ........... H04L 7/041 370/474 |
| 2006/0117174 A1 | 6/2006 | Lee |
| 2006/0120400 A1* | 6/2006 | Fukuoka ........... H04L 12/2801 370/447 |
| 2006/0268692 A1 | 11/2006 | Wright |
| 2006/0274650 A1 | 12/2006 | Tyagi et al. |
| 2007/0189184 A1 | 8/2007 | Ryu et al. |
| 2009/0086690 A1* | 4/2009 | Gu ............... H04B 7/0417 370/338 |
| 2010/0020820 A1 | 1/2010 | Jones |
| 2010/0329225 A1 | 12/2010 | Balasubramanian |
| 2011/0019685 A1 | 1/2011 | Diab et al. |
| 2011/0261814 A1 | 10/2011 | Matthews et al. |

\* cited by examiner

ENCAPSULATION FOR LINK LAYER PREEMPTION

CROSS REFERENCE TO RELATED APPLICATIONS

This application claims the benefit of priority to provisional application Ser. No. 61/768,164, filed 22 Feb. 2013, and to provisional application Ser. No. 61/774,900, filed 8 Mar. 2013, both of which are incorporated by reference in their entirety.

TECHNICAL FIELD

This disclosure relates to packet preemption. This disclosure also relates to encapsulation to support link layer preemption.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in packet handling will further enhance performance of data networks.

DETAILED DESCRIPTION

In communication networks, a prioritized (e.g., minimum) latency for transmitting data may have a lower bound according to the time to transmit a packet, such as a largest permitted Ethernet frame. A prioritized latency scenario may occur when a high priority (e.g., urgent) packet requiring low latency arrives immediately after a maximum size low priority (e.g., non-urgent) packet has begun transmission. Packet preemption may allow the high priority packet to interrupt transmission of a low priority packet. Transmission of the low priority packet may resume when the high priority packet has completed transmission. The discussion below presents methods, devices, systems, implementations, and techniques of packet encapsulation to support packet preemption, including Ethernet preemption. The encapsulation described below may be consistently applied to support preemption for any number of communication types, protocols, standards, and topologies, and across any combination of layers of a communication model, such as the Open Systems Interconnect (OSI) model. The encapsulation may apply more generally to preemption of any packet at a given priority level in favor of a different pack having a different priority level. While the descriptors 'high priority' and 'low priority' are sometimes used for explanatory purposes, the encapsulation may apply to preemption between any predetermined priority levels.

Figure 1:
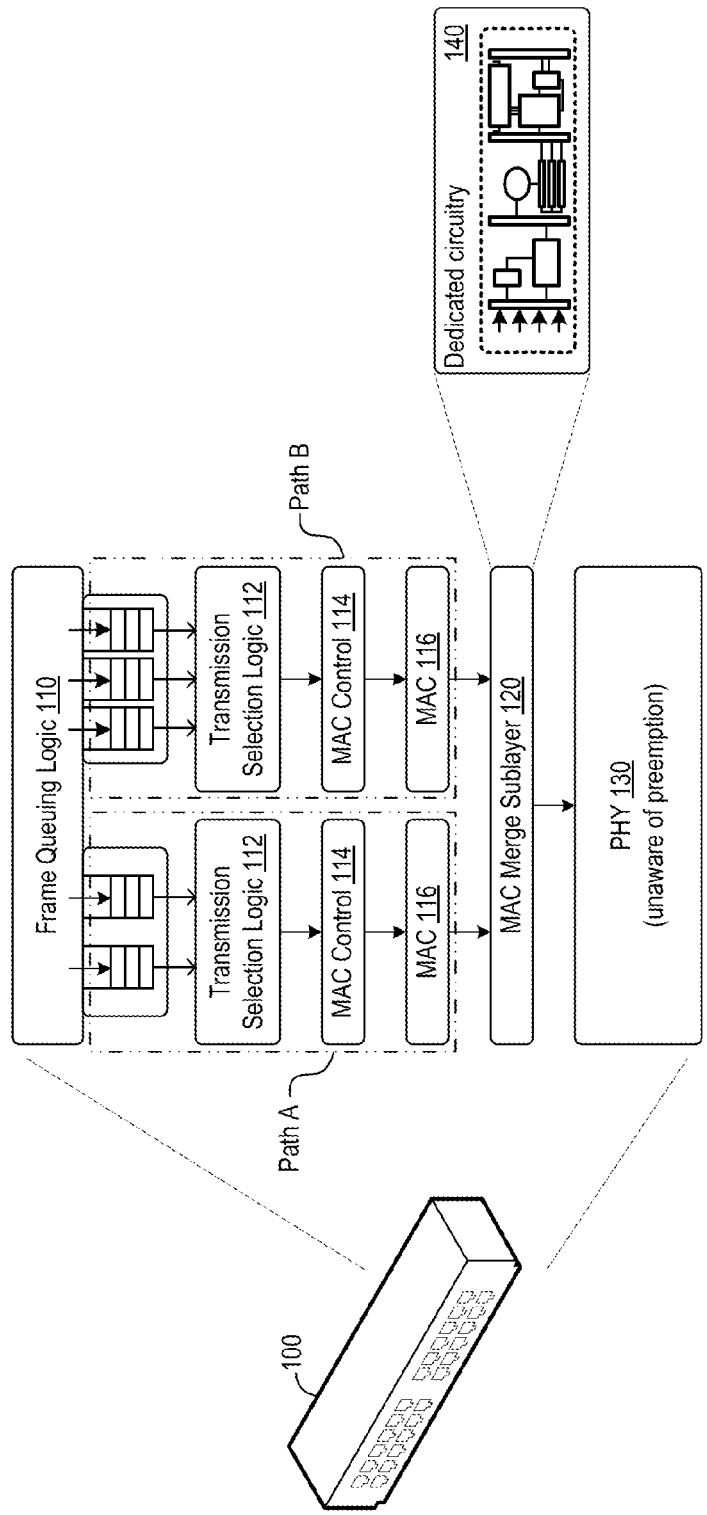
FIG. 1 shows an example of a device that implements encapsulation for link layer preemption.

FIG. 1 shows an example of a device 100 that implements encapsulation for link layer preemption. The device 100 may be a network device capable of communicating data according to any number of wired or wireless communication formats, protocols, modulations, standards, frequency channels, bit rates, and encodings. Thus, the device 100 may support communication using Ethernet, cable such as Data Over Cable Service Interface Specification (DOCSIS), Digital Subscriber Line (DSL), Multimedia over Coax Alliance (MoCA), power line (e.g. HomePlug AV), Ethernet Passive Optical Network (EPON), Gigabit Passive Optical Network (GPON), Integrated Services Digital Network (ISDN), Fiber Distributed Data Interface (FDDI), the 802.11a/b/g/n/ac standards, the 60 GHz WiGig/802.11TGad specification, Bluetooth, Global System for Mobile communications (GSM), Time Division Multiple Access (TDMA), Frequency Division Multiple Access (FDMA), Code Division Multiple Access (CDMA), and others. As examples, the device 100 may be a switch, hub, router, gateway, network bridge, or any other type of network device that processes or routes network data such as packets. The device 100 may be any electronic device that communicates data, such as desktop and laptop computers, mobile phones, personal data assistants, pocket computers, tablet computers, portable email devices, or processes or threads executed in memory by a processor.

The device 100 implements logic to support data communication, e.g., in hardware, software, or both. In FIG. 1, the device 100 includes as one particular implementation example frame queuing logic 110, transmission selection logic 112, Media Access Control (MAC) control 114, MAC logic 116, a MAC merge sublayer 120, and a physical (PHY) layer 130. The frame queuing logic 110 may assign data, e.g., frames, to one or more queues for transmission, such as the queues 131-135 in FIG. 1. The queues 131-135 may be configured according to any number of parameters, and different queues may respectively store frames of different communication priority.

The device 100 may implement particular processing paths differentiated according to any number of frame characteristics, one of which is priority. In FIG. 1, the device implements the two frame processing paths labeled as Path A and Path B in FIG. 1. A first path (e.g., Path A) may include any combination of transmission selection logic 112, MAC control 114, and MAC logic 116 for processing frames of a first priority and a second path (e.g., Path B) may include any combination of transmission selection logic 112, MAC control 114, and MAC logic 116 for processing frames of a second priority. In that regard, the different paths may include logically distinct circuitry, e.g., a respective MAC logic 116 for each path, though the distinct circuitry may be physically implemented in the same integrated circuit, chip, or die.

The device 100 supports packet preemption. In particular, the device 100 in FIG. 1 supports preemption in the data link layer ("link layer") of the OSI model. The MAC merge sublayer 120 may receive frames, e.g., Ethernet frames, from the MAC logic 116 of one or more processing paths. The MAC merge sublayer 120 may preempt, e.g., interrupt, communication of lower priority frames to transmit a higher priority frame. The MAC merge sublayer 120 may identify packet data, e.g., an Ethernet Frame, as a non-preemptible frame or as a preemptible frame. In one implementation, the MAC merge sublayer 120 identifies Distinguished Minimum Latency Traffic (DMLT) data as non-preemptible and non-DMLT data as preemptible.

The device 100 may implement the MAC merge sublayer 120 as intermediate logic that interfaces between two OSI layers. For example, the MAC merge sublayer 120 may interface between link layer logic (e.g., the MAC 116) and physical layer logic (e.g. the PHY layer 130) implemented by the device 100. The MAC merge sublayer 120 may operate transparently to the PHY layer 130, which may be unaware of frame preemption and encapsulation performed by the MAC merge sublayer 120. Similarly, the MAC 116 or other link layer logic may be unaware and/or unaffected by operation of the MAC merge sublayer 120.

In some implementations, the device 100 implements the MAC merge sublayer 120 in hardware as dedicated circuitry 140. The dedicated circuitry 140 may implement a state machine, for example, that controls functionality of the MAC merge sublayer 120. The dedicated circuitry 140 may include any combination of logic gates, memory elements (e.g., register files, flip-flops, etc.), programmable logic devices or controllers, relays, or any other hardware for implementing the MAC merge sublayer 120 in hardware. In other implementations, the device 100 may implement the MAC merge sublayer 120 as a hardware-software combination, for example as a processor and a memory storing processing instructions that the processor executes. Software implementations of the MAC merge sublayer 120 are also possible.

The MAC merge sublayer 120 can be implemented to fulfill various encapsulation goals to support preemption. The MAC merge sublayer 120 may preserve data integrity, e.g., such that encapsulation performed by the MAC merge sublayer 120 does not result in an increase in undetected errors. The MAC merge sublayer 120 can indicate particular MAC logic a frame belongs to, allowing for a receiving device to properly process a frame encapsulated by the MAC merge sublayer 120. Additionally, the MAC merge sublayer 120 can be implemented such that impact on throughput of the device 100 or portions thereof is minimized. The operation of the MAC merge sublayer 120 may operate transparently to interfacing logic, such as the PHY 130 in FIG. 1. As one particular example, the MAC merge sublayer 120 may operate transparently to non-deprecated PHY devices operating above 10 megabits per second (Mb/s). Put another way, the MAC merge layer 120 may support preemption and encapsulation regardless of the design, operational speed, or characteristics of the PHY device 130.

Optionally, the device 100 need not support operation of the MAC merge sublayer 120 over deprecated PHY clauses or for a 10BASE-T PHY. For instance, the MAC merge sublayer 120 may operate in an environment where fragments of an Ethernet Frame do not need to start with a full preamble. The MAC merge sublayer 120 may support a 10BASE-T PHY when the 10BASE-T PHY allows for shortened preambles.

The following discussion presents examples of a MAC merge sublayer 120 that supports link layer preemption for MAC frames, such as Ethernet frames. However, the MAC merge sublayer 120 may perform preemption and provide supporting encapsulation as described above and below across any additional or alternative OSI layers and for any additional or alternative communication protocols or standards.

The MAC merge sublayer 120 may obtain frame data (e.g., a MAC frame from a MAC 116, such as an Ethernet frame) and encapsulate the frame data to generate an encapsulated frame. The encapsulated frame may be referred to as an Mframe, which stands for a MAC merge frame. The Mframe may appear to the PHY 130 as frame data sent from link layer logic such as the MAC 116. For example, the MAC merge sublayer 120 may generate the Mframe such that the PHY 130 interprets the Mframe as an Ethernet frame, but the Mframe may contain data from an entire Ethernet frame or a fragment of the Ethernet frame (e.g., when preemption occurs).

An Mframe generated by the MAC merge sublayer 120 may include one or more MAC encapsulation elements. Some examples of MAC encapsulation elements are presented next, and discussed in greater detail below in connection with FIGS. 2-6. For example, the MAC merge sublayer 120 may generate the Mframe to include a frame preamble, particularly for Mframes storing a non-initial data fragment of a MAC frame. The MAC merge sublayer 120 may reduce the use of preamble bytes for a frame start for the non-initial data fragment. The MAC merge sublayer 120 may, for example, provide at least 2 bytes of preamble for fragments. The 1000BASE-X PHY can drop up to 2 bytes of preamble and insert a Start Frame Delimiter (SFD) over another byte. In other implementations, the 1000BASE-X PHY can drop 1 byte and delay the start of the preamble rather than drop and only overwrite 1 byte, similar to 10GBASE-X alignment.

As another example of a MAC encapsulation element, the MAC merge sublayer 120 may generate the Mframe to include identifying information that specifies an Mframe type. The identifying information may identify the Mframe as, for example, a non-preemptible frame (e.g., a frame carrying DMLT), the start of a preemptible frame, or a subsequent (non-initial) fragment of a preemptible frame, e.g., for a non-DMLT frame that has been preempted into multiple fragments. In that regard, the identifying information may provide a preemptible indication as to whether the Mframe is preemptible or non-preemptible. As yet another MAC encapsulation element, the Mframe may include protection for reassembly errors when an Mframe is lost, including a frame number, a fragment number, or both. In some implementations, the frame number and/or fragment number may be implemented as a circular count, with values ranging from 0 to 3 for example (i.e., a sequence of 0, 1, 2, 3, 0, 1, 2, 3, 0 . . . ). A generated Mframe may include a final fragment indication, which the MAC merge sublayer 120 may implement as an EOF marker, for example. The MAC merge sublayer 120 may encapsulate an EOF marker as one or more specific bits set in, e.g., the last Mframe of a preempted Ethernet frame, or as a separate bit field or data element (regardless of location in the Ethernet frame) that specifies which Mframe includes the last fragment of the Ethernet frame. The MAC merge sublayer 120 may encapsulate an Mframe storing non-final fragment data of the Ethernet frame with a non-final fragment indication.

In encapsulating frame data with one or more MAC encapsulation elements, the MAC merge sublayer 120 may insert additional information into an existing Ethernet frame, alter existing information in the Ethernet frame, or both. The MAC merge sublayer 120 may encapsulate an Ethernet frame to include a Start Mframe Delimiter (SMD) field, which may include one or more MAC encapsulation elements. In some implementations, the MAC merge sublayer 120 replaces an existing field or portion of a MAC frame with SMD data, such as a selected portion of the preamble of a MAC frame. In particular, the MAC merge sublayer 120 may replace the Start Frame Delimiter (SFD) data of an Ethernet frame with SMD data.

Figure 2:
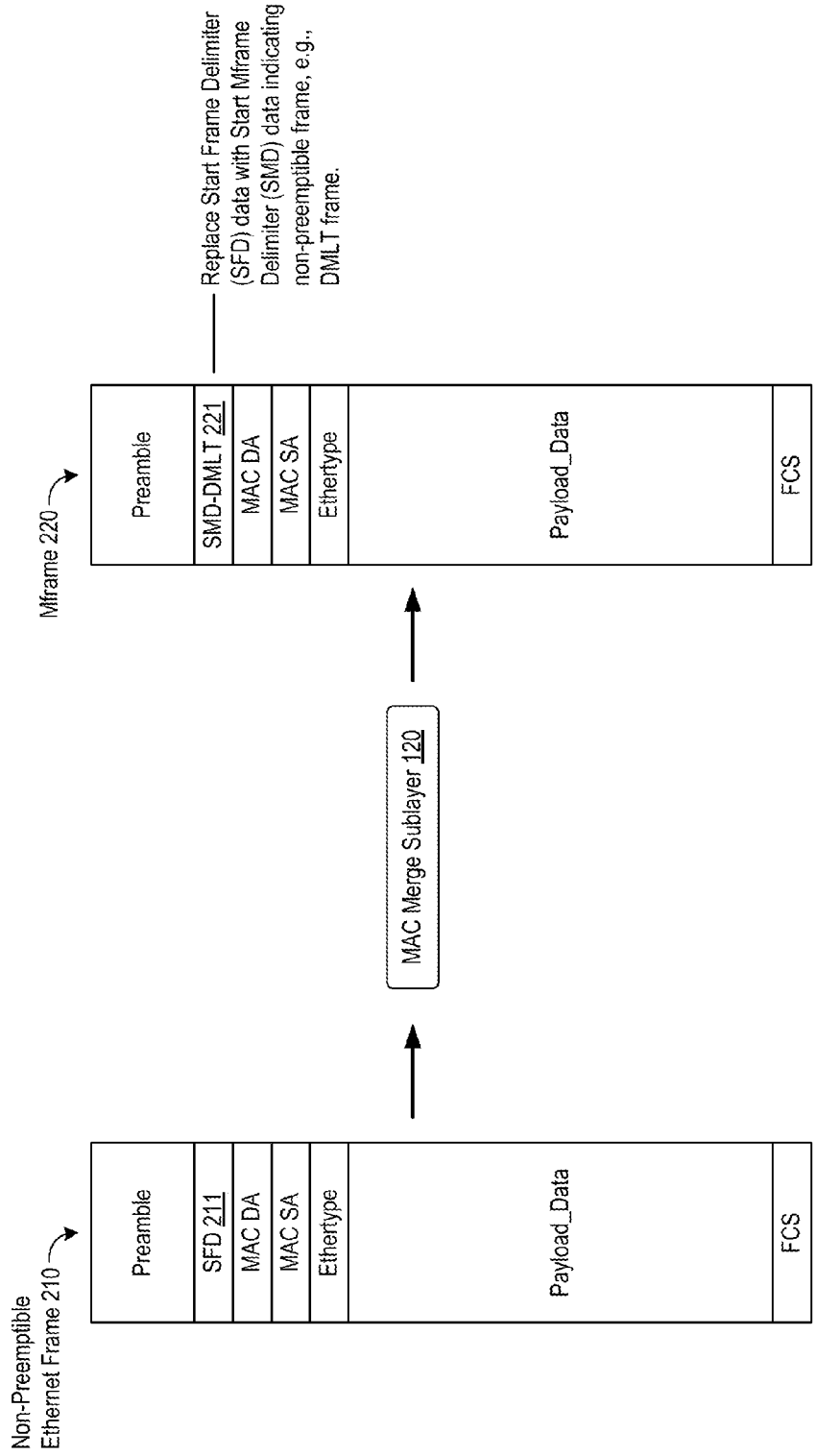
FIG. 2 shows an example of an encapsulation a Media Access Control (MAC) merge sublayer may perform for a non-preemptible frame.
Figure 3:
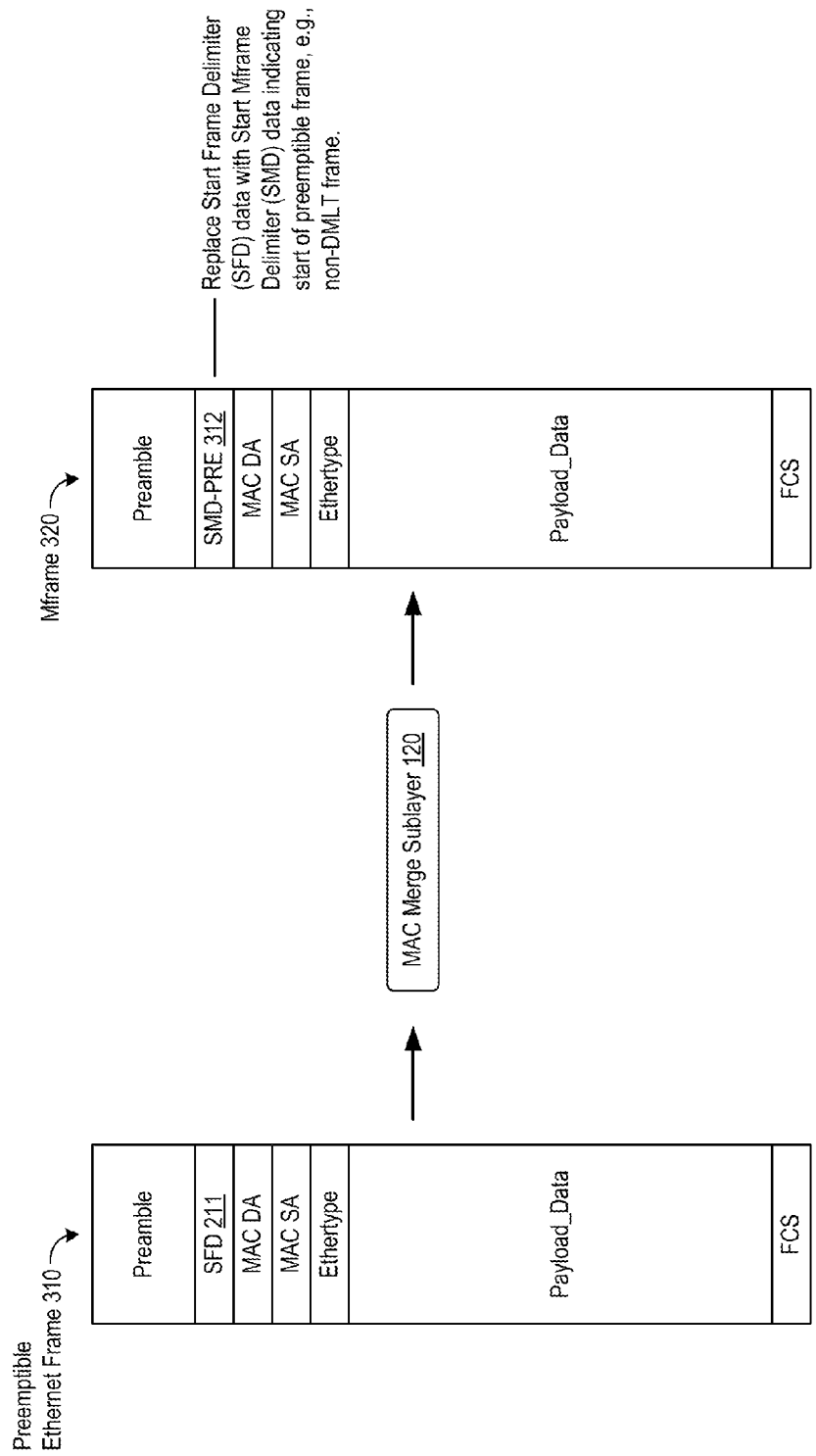
FIG. 3 shows an example of an encapsulation the MAC merge sublayer may perform for a preemptible frame.
Figure 4:
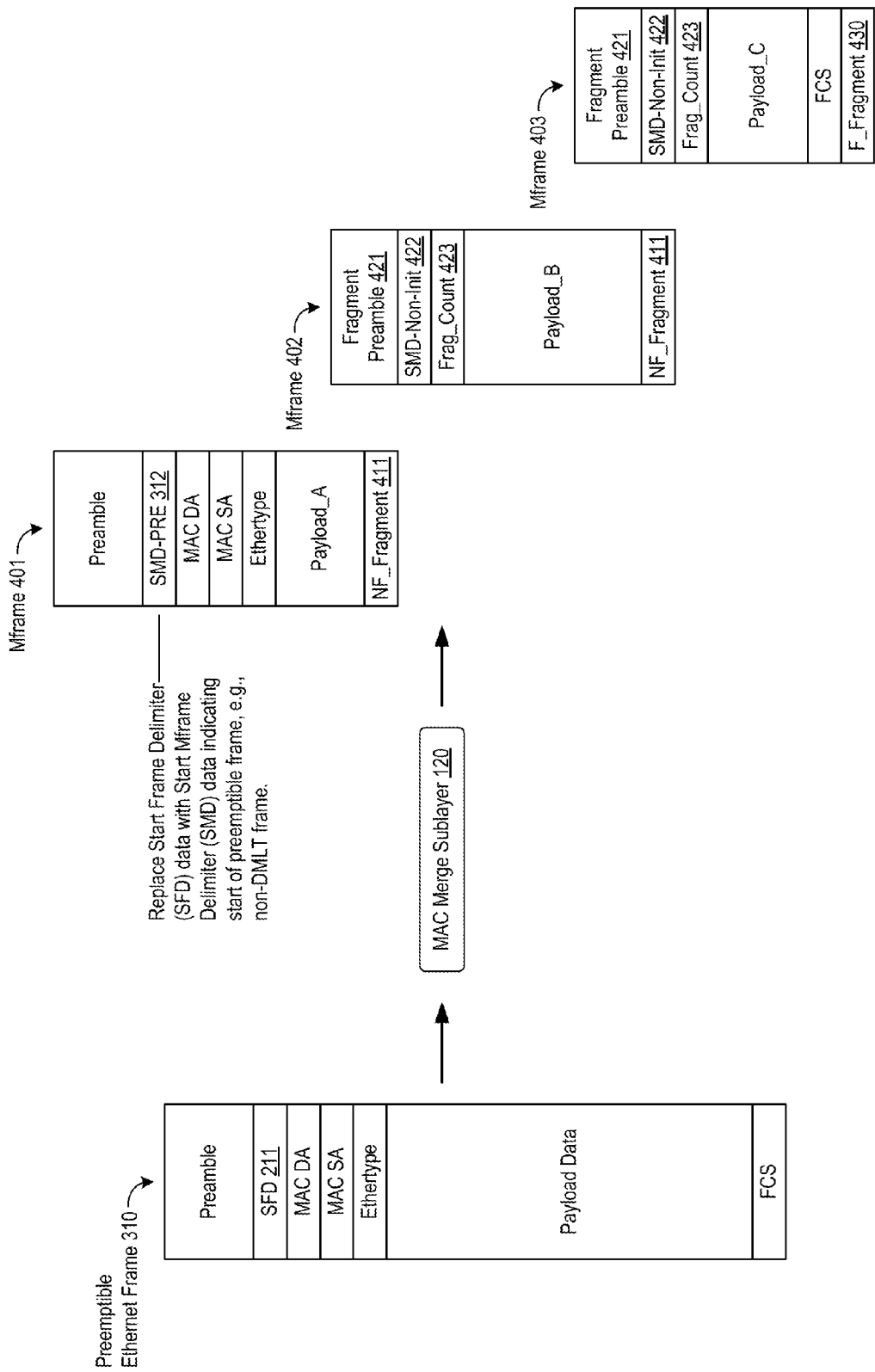
FIG. 4 shows an example of an encapsulation the MAC merge sublayer may perform for a preemptible frame that is preempted during transmission.

Exemplary encapsulations by the MAC merge sublayer 120 are presented next in FIGS. 2-4.

FIG. 2 shows an example of an encapsulation the MAC merge sublayer 120 may perform for a non-preemptible frame. In the example shown in FIG. 2, the MAC merge sublayer 120 receives a non-preemptible Ethernet frame 210. The MAC merge sublayer 120 may identify an Ethernet frame as preemptible or non-preemptible through inspection of a data element in the frame or according to a processing path or logical processing element the Ethernet frame is received from. For example, the MAC merge sublayer 120 may identify the non-preemptible Ethernet frame 210 as non-preemptible when receiving the Ethernet frame 210 from a particular MAC 116 that processes high priority data, e.g., DMLT data.

An Ethernet frame includes multiple data elements. In FIG. 2, the Ethernet frame 210 includes a preamble, start frame delimiter (SFD) data 211, a MAC destination address (DA), a MAC source address (SA), an Ethertype, payload data, and a frame check sequence (FCS). The SFD data 211 may be part of the preamble and mark the end of the preamble of an Ethernet frame. The FCS may include error detection data to preserve the integrity of the Ethernet frame 210. The FCS may include a cyclic redundancy check (CRC) value, for example, applicable to all or a selected portion of the data of the Ethernet frame 210.

The MAC merge sublayer 120 encapsulates the non-preemptible Ethernet frame 210 to generate the Mframe 220. The MAC merge sublayer 120 may replace the SFD data 211 with SMD data such that the SMD data indicates the Mframe 220 includes frame data of a non-preemptible frame, e.g., a DMLT frame. The SMD data may similarly identify that the Mframe is non-preemptible. The MAC merge sublayer 120 may add, append, or insert the SMD-DMLT value 221 into an Mframe to indicate the Mframe stores data from a non-preemptible frame and/or the Mframe is non-preemptible.

The MAC merge sublayer 120 may replace the SFD data 211 with SMD data having less, the same, or more bits than the replaced SFD data 211. In FIG. 2, the MAC merge sublayer 120 replaces the SFD data 211 of the non-preemptible Ethernet frame 210 with a SMD-DMLT value 221 having the same amount of bits as the replaced SFD data 211. In one implementation, SFD data 211 of an Ethernet frame includes one byte of data, and the MAC merge sublayer 120 replaces the SFD data 211 byte with a byte of SMD data.

In some implementations, the MAC merge sublayer 120 generates the Mframe 220 by replacing the pre-existing SFD data 211 with SMD data while leaving the remaining data elements of the non-preemptible Ethernet frame 210 unchanged. In that regard, the MAC merge sublayer 120 may encapsulate a non-preemptible Ethernet frame 210 into the Mframe 220 to support link layer preemption without increasing the amount of data to transmit within the encapsulated frame and/or without adding additional data to surround the MAC frame. Put another way, encapsulation by the MAC merge sublayer 120 may be performed without surrounding an existing frame with additional data.

FIG. 3 shows an example of an encapsulation the MAC merge sublayer 120 may perform for a preemptible frame. In FIG. 3, the MAC merge sublayer 120 receives a preemptible Ethernet frame 310. The MAC merge sublayer 120 may identify a frame as preemptible when, for instance, it receives the frame from MAC logic 116 that processes non-DMLT. As additional examples, the MAC merge sublayer 120 may identify a frame as preemptible or not by examining metadata passed from the upper layer (e.g., MAC logic 116) with the request to transmit the frame—e.g. by inspecting quality of service (QoS) information passed with the data frame or inspecting one or more of the header fields in the data frame—e.g. based on the priority bits (PCP—Priority Code Point) bits in a virtual local area network (VLAN) tag, the VLAN identification ID, or the Ethertype of the frame, which may indicate if traffic from a certain protocol as indicated by a certain Ethertype requires the prioritized latency. As yet another example, the MAC merge sublayer 120 may identify whether a frame is preemptible based on reservations established for certain traffic, e.g. determining traffic with a particular destination address or a particular pair of source and destination addresses as preemptible or non-preemptible.

The MAC merge sublayer 120 may be unaware of whether a preemptible Ethernet frame 310 will be preempted during transmission of an Mframe for the preemptible Ethernet frame 310. The example shown in FIG. 3 depicts an encapsulation that the MAC merge sublayer 120 may perform when transmission is not preempted. That is, the MAC merge sublayer 120 may generate and transmit the Mframe 320 when transmission of the Mframe 320 is not preempted mid-transmission.

In FIG. 3, the MAC merge sublayer 120 replaces the SFD data 211 of the preemptible Ethernet frame 310 with SMD data. The SMD data in the resulting Mframe 320 may indicate, e.g., the Mframe 320 includes data from a preemptible Ethernet frame 310 and that the Mframe 320 is the initial fragment of the preemptible Ethernet frame 310. In particular, the Mframe 320 shown in FIG. 3 includes SMD data with the SMD-PRE value 312 indicating the Mframe 320 stores an initial fragment of a preemptible frame. Accordingly, the SMD-PRE value 312 may indicate that the Mframe 320 is preemptible. In the exemplary scenario depicted in FIG. 3, the MAC merge sublayer 120 determines not to preempt transmission of the Mframe 320, and thus Mframe 320 is the initial and only fragment storing data from the preemptible Ethernet frame 310. Accordingly, the MAC merge sublayer 120 may transmit a subsequent Mframe with a different (e.g., incremented) frame number, a receiving device may identify that the Mframe 320 includes the frame data of the preemptible Ethernet frame 310.

In some implementations, the MAC merge sublayer 120 may specify SMD data that associates a frame number with Mframe(s) storing data from a particular preemptible Ethernet frame 310. For example, the SMD-PRE value 312 stored in the Mframe 320 may indicate the Mframe 320 as the initial fragment storing preemptible data and associate a frame number with the Mframe 320 (e.g., frame 0). As noted above, associating a frame number (e.g., numbers rotating circularly 0-3) may provide protection from reassembly errors when an Mframe is lost during transmission from the device 100 to a receiving network device.

For preemptible data that is not preempted during transmission, the MAC merge sublayer 120 may generate the Mframe 320 from the preemptible Ethernet frame 310 without adding additional bits. For example, the MAC merge sublayer 120 may replace the SFD data 211 of the preemptible Ethernet frame 310 with a SMD-PRE value 312 having the same amount of bits as the replaced SFD data 211, and optionally without altering other data elements of the preemptible Ethernet frame 310. Thus, when transmission of the data from the preemptible Ethernet frame 310 via the Mframe 320 is not preempted, the encapsulation implemented by the MAC merge sublayer 120 may efficiently support link layer preemption without an increase in the amount of transmitted data.

FIG. 4 shows an example of an encapsulation the MAC merge sublayer 120 may perform for a preemptible frame that is preempted during transmission. In FIG. 4, the MAC merge sublayer 120 encapsulates preemptible Ethernet frame 310 by generating the Mframes labeled as 401, 402, and 403, which may result from preemption occurring during transmission of data from the preemptible Ethernet frame 310. That is, preemption during transmission may cause the MAC merge sublayer 120 to transmit the Mframes 401, 402, and 403 to a receiving network device, and the Mframes 401, 402, and 403 may store a fragment of the data for the preemptible Ethernet frame 310.

The MAC merge sublayer 120 may receive a preemptible Ethernet frame 310 for encapsulation and replace the SFD data 211 of the preemptible Ethernet frame 310 with a SMD-PRE value 312. Thus, in FIG. 4, the Mframe 401 includes the SMD-PRE value 312 indicating the Mframe 401 includes the start (e.g., initial fragment) of a preemptible Ethernet frame 310. The SMD-PRE value 312 may also indicate an associated frame number for the Mframe 401, which may guard against improper reassembly cause by one or more Mframes lost during transmission. The MAC merge sublayer 120 may preempt (e.g., interrupt) transmission of a preemptible Mframe to transmit a higher priority (e.g., non-preemptible) Mframe. In the example shown in FIG. 4, the MAC merge sublayer 120 preempts transmission of the Mframe 401 after having transmitted a first portion (e.g., fragment) of data from the preemptible Ethernet frame 310, including the MAC DA, MAC SA, Ethertype, and the portion of the payload data labeled in the Mframe 401 as Payload_A. Prior to interrupting transmission of the Mframe, the MAC merge sublayer 120 may append a non-final fragment indication 411 to the Mframe 401, which may indicate that the Mframe 401 includes a fragment of data from the preemptible Ethernet frame 310 and one or more subsequent data fragments will follow.

Upon resuming transmission of data for the preemptible Ethernet frame 310 (e.g., after completing transmission of the higher priority Mframe), the MAC merge sublayer 120 may transmit one or more Mframes storing the remaining portion of data for the preemptible Ethernet frame 310. The MAC merge sublayer 120 may encapsulate the remaining (e.g., non-initial) data fragment(s) of the preemptible Ethernet frame 310. In FIG. 4, the MAC merge sublayer 120 generates the Mframe 402 resulting from preemption occurring while transmitting the Mframe 401, as well as the Mframe 403 resulting from a subsequent preemption occurring while transmitting the Mframe 402.

The MAC merge sublayer 120 may generate Mframe start data for non-initial data fragments such as Mframe 402 and Mframe 403. The Mframe start data may include a fragment preamble, SMD data, and a fragment count value. In FIG. 4, the MAC merge sublayer 120 generates Mframe start data for the Mframes 402 and 403 as the fragment preamble labeled as 421, the SMD-Non-Init value 422, and the fragment count value 423. In some implementations, the fragment preamble includes 3 bytes of preamble data shortened from the 7 bytes of preamble data for an Ethernet frame, the SMD-Non-Init value 422 is represented in 1 byte of data, and the fragment count value 423 is represented in one byte of data.

The SMD data may indicate that a particular Mframe is a non-initial fragment of an interrupted transmission. For example, the SMD-Non-Init value 422 may indicate the Mframes 402 and 403 contain non-initial data fragments from a preemptible Ethernet frame 310. The SMD-Non-Init value 422 may also indicate that the Mframe is preemptible. In some implementations, the SMD-Non-Init value 422 includes a frame number associated with an Mframe that stores a non-initial data fragment of preemptible frame data. Thus, the SMD-PRE value 312 in the Mframe 401 and the SMD-PRE value 422 in the Mframes 402 and 403 may indicate a consistent (e.g., identical) associated frame number, e.g., frame number 0, since the Mframes 401, 402, and 403 carry data fragments originating from the same Ethernet frame.

The fragment count value 423 may indicate an ordering for non-initial data fragments, which may allow a receiving device to identify multiple Mframes as storing data fragments from the same preemptible frame. In that regard, the fragment count number 423 may be used to protect against the loss of a fragment during transmission. For example, the MAC merge sublayer 120 may specify the fragment count value 423 for Mframe 402 as a first non-initial fragment (e.g., fragment count=0) and specify the fragment count value 423 for Mframe 403 as a second non-initial fragment (e.g., fragment count=1). Thus, a receiving device may determine loss of an Mframe when the SMD data of consecutive Mframes indicating a common associated frame number do not include fragment count values 423 that are consecutively sequenced (e.g., jumping from fragment count value of 1 to 3, or 2 to 0, for a circular fragment count ranging from 0-3). In some implementations, the MAC merge sublayer 120 includes a fragment count value 423 for an Mframe that stores a non-initial fragment of preemptible frame data (e.g., Mframes 402 and 403), but not for the Mframe that stores the initial fragment (e.g., Mframe 401). In other implementations, the MAC merge sublayer 120 may include the fragment count value 423 in the Mframe storing an initial fragment of preemptible frame data.

In FIG. 4, the MAC merge sublayer 120 preempts transmission of Mframe 402 after a second portion of the payload data of the Ethernet frame 310 has been transmitted, which is labeled as Payload_B in FIG. 4. Prior to interrupting transmission of the Mframe 402, the MAC merge sublayer 120 may append a non-final fragment indication 411 to Mframe 402, which may indicate that the Mframe 402 partially includes the data of the preemptible Ethernet frame 310 and one or more subsequent fragments will follow. In transmitting Mframe 403, the MAC merge sublayer 120 transmits the remaining portion of the preemptible Ethernet frame 310, including the remaining portion of the payload data labeled as Payload_C and the FCS for the preemptible Ethernet frame 310. In some implementations, the MAC merge sublayer 120 may append a final fragment indication 430 specifying that Mframe 430 contains the final data fragment of a preemptible Ethernet frame. In other implementations, the MAC merge sublayer 120 may forego appending an additional final fragment indication 430, and instead the FCS specifying the end of the data for the preemptible Ethernet frame 310.

The MAC merge sublayer 120 may provide a non-final fragment indication 411 and/or final fragment indication 430 in various ways. The MAC merge sublayer 120 may provide an indication of the end of a preempted Ethernet frame, e.g., that an Mframe includes the last data fragment of the Ethernet frame. As the device 100 may be unaware that an Mframe will be preempted until transmission of the Mframe is in progress, the MAC merge sublayer 120 may indicate whether an Mframe is the final fragment.

In one example, the MAC merge sublayer 120 may add a fragment trailer to preemptible Mframes, e.g., Frames with SMD data indicating a preemptible Mframe or storing data from a preemptible Ethernet frame 310. The fragment trailer may indicate whether the Mframe stores the last portion of a preemptible Ethernet frame 310. The fragment trailer may be 1 byte in length and, as one exemplary implementation, all 0's (e.g., 0x00) indicates transmission of data for the preemptible Ethernet frame 310 is incomplete and all 1's (e.g., 0xFF) indicates transmission of data for the preemptible Ethernet frame 310 is complete. As another example, the fragment trailer may use 4 bits to provide the finality indication and reserve 4 bits. In another variation, the MAC merge sublayer 120 may encode a fragment number and provide a final fragment indication 430 and/or non-final indication 411 through use of multiple values (e.g., 5) with a Hamming distance. In this variation, the MAC merge sublayer 120 may encode the fragment number in the fragment trailer, without including the fragment number in the Mframe start data. The MAC merge sublayer 120 may specify the following exemplary representation of eight values of the fragment trailer with a Hamming distance of 4:

0x66: Frame complete; Fragment #0;
0xCC: Frame complete, Fragment #1;
0xFF: Frame complete, Fragment #2;
0xAA: Frame complete, Fragment #3;
0xE1: Frame incomplete, Fragment #0;
0xD2: Frame incomplete, Fragment #1;
0x1 E: Frame incomplete, Fragment #2; and
0x2D: Frame incomplete, Fragment #3.

As another option, the MAC merge sublayer 120 may identify completion of transmission of a preemptible Ethernet frame 310 through an altered CRC calculation. The MAC merge sublayer 120 may keep a running CRC calculation as Mframe bits are transmitted, e.g., by performing a consistent or identical CRC calculation as may be done in the MAC 116 or other MAC sublayer. In response to a transmission interruption or preemption indication, the MAC merge sublayer 120 may alter the intermediate CRC result and append the altered intermediate CRC to the Mframe as the non-final fragment indication 411.

To generate the non-final fragment indication 411, the MAC merge sublayer 120 may invert a selected portion of the intermediate CRC result. The intermediate CRC result may refer to the CRC computed over a selected portion of the Ethernet frame 310 that has been transmitted so far, e.g., in one or more previously transmitted fragments of the Ethernet frame 310. The selected portion that the intermediate CRC result applies to include portions of the transmitted Ethernet frame 310 that are also used to determine the FCS value, e.g., the selected portion that includes data from the MAC destination and source address, Ethertype, and/or payload fields. The MAC merge layer 120 may, for example, invert the second two bytes of a 4-byte intermediate CRC value to obtain the altered CRC result. The MAC merge sublayer 120 may append the altered CRC result to an Mframe storing the non-final data fragment, e.g., to the non-final Mframe 401 or 402. For example, the MAC merge sublayer 120 may determine the non-final fragment indication 411 for the Mframe 401 to be an altered intermediate CRC result, altered from the running CRC value calculated from the MAC DA, MAC SA, Ethertype, and Payload_A data of the preemptible Ethernet frame 310. The MAC merge sublayer 120 may determine the non-final fragment indication 411 for the Mframe 402 to be an altered intermediate CRC result, altered from the running CRC value calculated for the MAC DA, MAC SA, Ethertype, Payload_A, and Payload_B data of the preemptible Ethernet frame 310. In this example, the MAC merge sublayer 120 may not include any additionally generated final fragment indication 430 when sending the Mframe 430 storing the final data fragment of the preemptible Ethernet frame 310, instead allowing the FCS to indicate completion of transmitting the Ethernet frame data, e.g., the FCS serves as a final fragment indication 430.

The receiving MAC merge sublayer 120 of a receiving device may run a CRC calculation as a non-final Mframe is received. When an Mframe ends, the receiving MAC merge sublayer 120 can test the calculated CRC value against the non-final fragment indication 411 in the Mframe (which may be a 4 byte altered intermediate CRC value) to determine whether the MAC frame is the final Mframe or not. For variations where the transmitting MAC merge sublayer 120 inverts the last 2 bytes of a 4-byte intermediate CRC result, if the difference between the calculated CRC value and the last 4 bytes of the Mframe is 0xFFFF, the receiving MAC merge sublayer 120 may determine the Mframe is the final Mframe, e.g., storing the final data fragment from the preemptible Ethernet frame 310. If the difference between the calculated value and the last 4 bytes of the Mframe is 0x00FF, then the receiving MAC merge sublayer 120 may determine the received Mframe carries a non-final fragment of the preemptible Ethernet frame 310.

The MAC merge sublayer 120 may selectively append a final fragment indication 430 to an Mframe. Note that in for Mframes 220 and 320 shown in FIGS. 2 and 3 respectively, the MAC merge sublayer 120 foregoes appending an additional final fragment indication even though Mframes 220 and 320 stores the ending portion of an Ethernet frame. The MAC merge sublayer 120 may forego appending a final fragment indication 430 when the MAC merge sublayer 120 sends an Ethernet frame as a single Mframe. In these scenarios, the FCS (e.g., CRC value) of the Ethernet frame may indicate completed transmission of the Ethernet frame. In some implementations, the MAC merge sublayer 120 may forego appending a final fragment indication 430 to a final non-initial fragment, e.g., a non-initial Mframe that stores the last portion of a preempted Ethernet frame 310 such as the FCS data. In these implementations, the FCS data in the Mframe storing the final fragment of the Ethernet frame 310 may itself serve as the final fragment indication 430, allowing the MAC merge sublayer 120 to indicate a final fragment of preemptible frame data without using additional bits.

The MAC merge sublayer 120 may generate Mframe start data without routing information, such as for an Mframe storing a non-initial data fragment of a preempted data frame. In that regard, the MAC merge sublayer 120 may implement encapsulation for reassembly of fragmented data frames on a hop-by-hop basis. By doing so, the MAC merge sublayer 120 need not allocate additional bits for specifying routing information in the Mframes storing subsequent data fragments, thus reducing the number of bits to encapsulate the fragmented frame data, providing increased communication efficiency, and reducing overhead. To illustrate, in FIG. 4, the MAC merge sublayer 120 generates the Mframes 402 and 403 to not include routing information, e.g., without allocating additional bits to store the MAC destination address and MAC source address information already transmitted in the Mframe 401. A subsequent receiving device in a communication path that receives the Mframes 401, 402, and 403 may reassemble the Mframes 401, 402, and 403 to recover data from the Ethernet frame 310. As the Mframe 401 stores the routing information for the preemptible Ethernet packet 310, the receiving device can further route the reassembled packet even though separately transmitted Mframes 402 and 403 do not include routing information. By supporting hop-by-hop reassembly, the encapsulation performed by the MAC merge sublayer 120 may also reduce an amount (e.g., number or capacity) of reassembly queues in the receiving device, and in some implementations, the receiving device can support preemption and reassembly of non-DMLT data with a single reassembly queue configured to store fragments of a preempted data frame.

As the device 100 routes Mframes 401, The receiving device may identify an association between the Mframes 401, 402, and 403 through a common (e.g., same) associated frame number indicated through the SMD data of the Mframes 401, 402, and 403, and reassemble the Mframes 401, 402, and 403 accordingly. The receiving device may also ensure completeness of the reassembled frame data through verifying a consistent frame number and proper ordering of fragment count values, e.g., ensuring fragment count values increment sequentially (e.g., 0 to 1 to 2 to 3 to 0 to 1 to 2, and so on for a circular fragment count with values from 0-3). Thus, though the MAC merge sublayer 120 may implement a circular fragment count with, for example, four values sequencing from 0-3, the MAC merge sublayer 120 may support preempting transmission of Ethernet frame data into more than four fragments.

The MAC merge sublayer 120 may represent the SMD data in a constant size for various types of Mframes (e.g., preemptible, non-preemptible initial, non-preemptible and non-initial). In some implementations, the MAC merge sublayer 120 represents the SMD as one byte of data. The SMD data may indicate an Mframe type and associated frame number. In some implementations, SMD data values may have a Hamming distance of 4 from each other. Table 1 below shows exemplary encodings for SMD data represented in one byte, indicating Mframe type and frame number, and with a Hamming distance of 4:

TABLE 1

Exemplary encoding for SMD data

| Mframe Type | Frame Number | SMD Byte Encoding |
|---|---|---|
| SMD-DMLT 221, e.g., storing non-preemptible frame data and indicating a non-preemptible Mframe | N/A | 0x55 |
| SMD-PRE 312, e.g., storing initial fragment of preemptible frame data and indicating preemptible Mframe | 0<br>1<br>2<br>3 | 0x66<br>0xCC<br>0xFF<br>0x33 |
| SMD-Non-Init 422, e.g., storing non-initial fragment of preemptible frame data and indicating preemptible Mframe | 0<br>1<br>2<br>3 | 0xE1<br>0xD2<br>0x1E<br>0x2D |

In some implementations, the MAC merge sublayer 120 represents the fragment count value 423 as a data byte, with numbering ranging from 0-3, and with values having a Hamming distance of 4, for example as follows:

TABLE 2

| Fragment Count Value 423 | Byte Encoding |
|---|---|
| 0 | 0x66 |
| 1 | 0xCC |
| 2 | 0xFF |
| 3 | 0x33 |

The MAC merge sublayer 120 may generate an Mframe that includes error checking data for MAC encapsulation elements, e.g., SMD data or fragment count data. For example, the MAC merge sublayer 120 may implement the SMD data or the fragment count value 423 with a lesser number of bits (e.g., without Hamming distance) and include error checking data to confirm the integrity of the SMD data, the fragment count data, or both.

Figure 5:
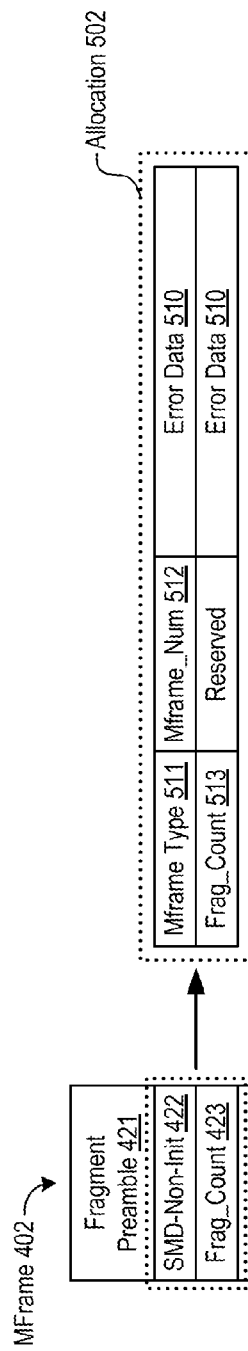
FIG. 5 shows an example of an allocation within encapsulation data for error checking data.

FIG. 5 shows an example of an allocation within encapsulation data for error checking data. In particular, FIG. 5 shows exemplary allocations 502 and 504 for SMD data, fragment count data, and error checking data. The MAC merge sublayer 120 may allocate a portion of the Mframe start data for error checking data 510. In particular, FIG. 5 provides an example of an allocation 502 for a preemptible non-initial Mframe, such as Mframe 402, which includes one byte of SMD data (e.g., the SMD-Non-Init value 423) and one byte of fragment count data (e.g., the fragment count value 423). The MAC merge sublayer 120 may implement the error checking data 510 as a Cycle Redundancy Check (CRC) value, parity check code, or other error checking data to confirm or verify the integrity of the encapsulation data in the Mframe start data, e.g., as an alternative to implementing SMD data values and/or fragment count values with Hamming distance.

The MAC merge sublayer 120 may allocate all of, or a portion of any number of non-error checking data fields in the Mframe start data for the error checking data 510. For example, the MAC merge sublayer 120 may allocate all or a portion of the SMD data field (e.g., the SMD-Non-Init 422 value stored in Mframe 402), all or a portion of a fragment count data field (e.g., the fragment count value 423 stored in Mframe 402), or both, for the error checking data 510. In one implementation, the MAC merge sublayer 120 uses 4 bits of an SMD data byte and 4 bits of a fragment count value 423 byte for error checking data 510 (e.g., CRC or parity code). In this implementation, the remaining 4 bits of the SMD data byte may be allocated as follows: 2 bits to indicate an Mframe type 511 and 2 bits to indicate frame number 512. The remaining 4 bits of the fragment count data byte may be allocated as follows: 2 bits to indicate a fragment count 513 and 2 bits reserved. The exemplary allocation 502 provides just one of any number of allocation variations the MAC merge sublayer 120 may implement to include error checking data 510 that confirms the integrity of one or more non-error MAC encapsulation elements. Exemplary allocation 504 provides an example of another allocation the MAC merge sublayer 120 may implement, storing the error checking data 510 as a consecutive or single data element (e.g., as a data byte that replaces the fragment count value 423).

In addition or as an alternative to the encapsulation examples described above, The MAC merge sublayer 120 may generate a MAC merge deader (MMH) that indicates any combination of MAC encapsulation elements and/or other information. The MAC merge sublayer 120 may generate a MMH for none, some, or all Mframes.

Figure 6:
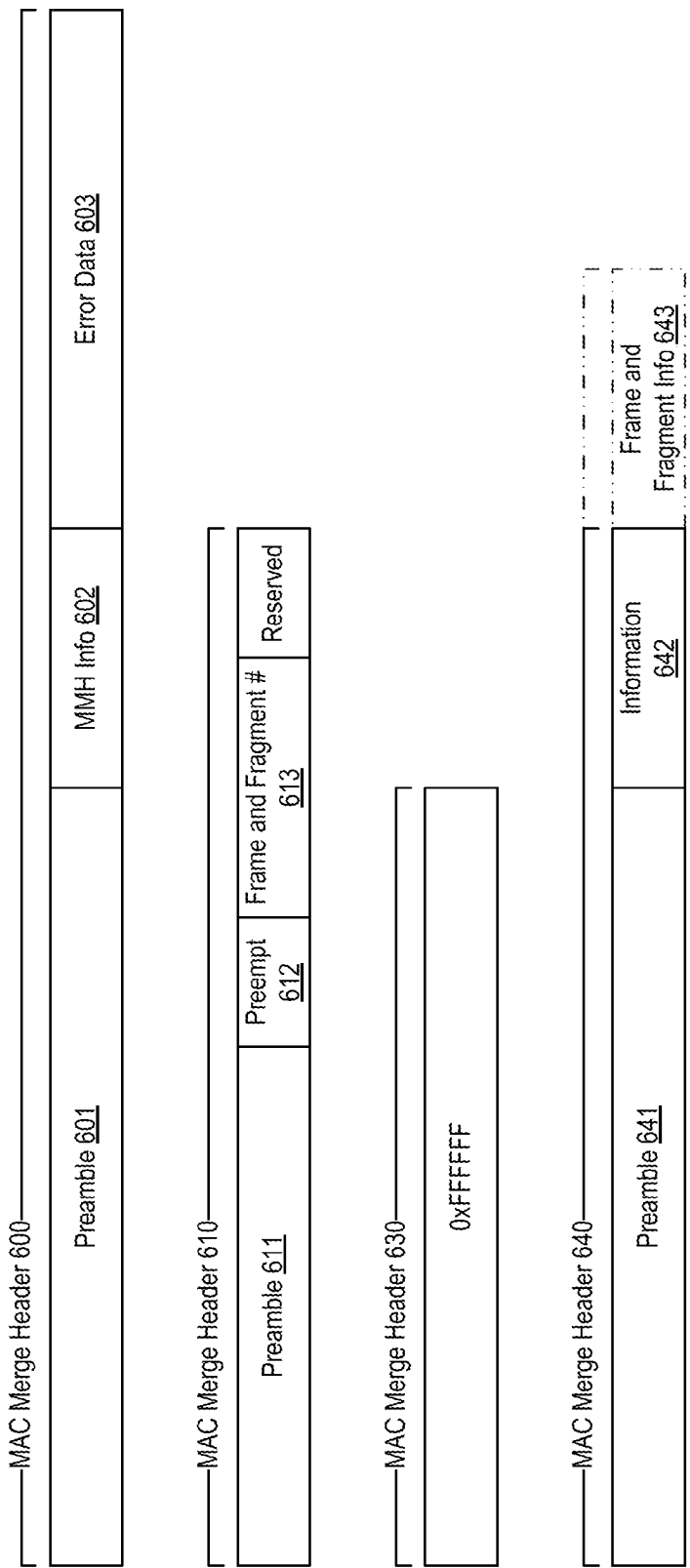
FIG. 6 shows exemplary MAC merge headers that the MAC merge sublayer may generate.

FIG. 6 shows exemplary MAC merge headers 600, 610, 620, and 630 that the MAC merge sublayer 120 may generate.

In a first exemplary implementation, the MAC merge sublayer 120 may generate the MMH 600. The MMH 600 may be 6 bytes in length, including 3 bytes for a preamble 601, 1 byte for an MMH information field 602, and 2 bytes for error data 603 (e.g., CRC data) for the MMH. The preamble 601 of MMH 600 may allow for PHY substitution of a PHY start of packet delimiter data in place of the preamble 601, e.g., by the PHY 130. The MMH information field 602 may identify an Mframe type, e.g., as non-preemptible or preemptible and ensure correct reassembly of fragmented Mframes. The error data 603 may protect and confirm the integrity of the MMH 600.

In some implementations, the MMH information field 602 includes a preemptible indicator, which may identify whether an Mframe includes data from a preemptible frame (e.g., preemptible Ethernet frame 310) or a non-preemptible frame (e.g., non-preemptible Ethernet frame 210). The preemptible indicator may also specify a particular receive MAC of a receiving device to process the Mframe. In one example, the preemptible indicator is 1-bit in length, and a value of 0 may specify the Mframe includes data from DMLT or a non-preemptible frame and a value of 1 may specify the Mframe includes data from preemptible frame.

When the preemptible indicator has a value of 0, the remaining bits in an MMH information field 602 may be reserved. When the preemptible indicator has a value of 1, the remaining bits in the MMH information field 602 may specify a frame number value, a fragment number value, or both. In some implementation, the frame number value may be 3 bits in length. The MAC merge sublayer 120 may specify the frame number to protect against the end of one Ethernet frame being concatenated to the start of another Ethernet frame, e.g., if the last fragment of one Ethernet frame and starting fragment of another Ethernet frame are concatenated. The value of the frame number can be incremented for a preemptible frame processed by the MAC merge sublayer 120. If a receiving device receives a fragment with a different frame number value than the frame currently in process, the receiving device may discard the frame, e.g., a MAC merge sublayer 120 implemented in the receiving device passes an incorrect CRC value.

The fragment number value of the MMH information field 602 may protect against the loss of a fragment. In one implementation, the fragment number value is 3 bits in length. In this or other implementations, the value of the fragment number may have a value of 0x0 in the MMH 600 at the start of an Ethernet frame and increments for subsequent fragments, e.g., subsequent fragments resulting from preemption. The MAC merge sublayer 120 may wrap the value of the fragment number, e.g., from 0x7 to 0x0 if there are more than 8 fragments. If a receiving device receives an Mframe with a fragment number value incremented by more than one than the fragment number value of the previous Mframe, the receiving device may discard the frame. In implementations where the MMH information field 602 is one byte in length, the MAC merge sublayer 120 may represent the preemptible indicator as 1 bit, the frame number value as 3 bits, and the fragment number value as 3 bits. The remaining 1 bit of the MMH information field 602 may be reserved.

In a second exemplary implementation, the MAC merge sublayer 120 may generate the MMH 610. The MMH 610 may be 4 bytes in length, including 2 bytes for the preamble 611. The MMH 610 may include 4 bits for a preemptible indicator where, for example, all 1's (e.g., 0xF) indicates the Mframe stores data from a preemptible Ethernet frame and all 0's (e.g., 0x0) indicates the Mframe stores data from a DMLT or other non-preemptible frame. The MMH 610 may include a 2-bit frame number value and a 2-bit fragment number value that the MAC merge sublayer 120 may concatenate and encode into 8-bits for a Hamming distance of 4 and stored as the frame and fragment number value 613, for example. In some implementations, the frame number and fragment number may be concatenated and encoded into 9-bits.

In a third exemplary implementation, the MAC merge sublayer 120 may generate the MMH 630. The MAC merge sublayer 120 may generate the MMC 630 for preemptible non-initial Mframes, e.g., Mframes storing a non-initial fragment of preemptible frame data (such as Mframe 402 or 403), but may forego generating the MMH 630 for non-preemptible Mframes (such as Mframe 220) and preemptible initial Mframes (such as Mframe 320 or 401). In this exemplary implementation, the MAC merge sublayer 120 may generate the MMH 630 for Mframes storing continuing fragments of a preempted Ethernet frame, which may be identified by starting the Mframe with 3 bytes of 0xFF instead of the 0xAA preamble data of Ethernet frames found at the beginning of initial Mframes, whether preemptible or non-preemptible. The MAC merge sublayer 120 of a receiving device may choose a receive MAC for processing a received Mframe. A MAC merge sublayer 120 implemented in the receiving device may inspect the Mframe data, e.g., by examining priority bits, though this may involve a layer violation or assumption that untagged frames are preemptible. The MAC merge sublayer 120 of the receiving device may default to reception by a preemptible MAC. If an incomplete fragmented frame is in process, the MAC merge sublayer 120 of the receiving device may send a new frame to a processing path or MAC for processing DMLT data.

In a fourth exemplary implementation, the MAC merge sublayer 120 may generate the MMH 640, which may vary in length depending on the Mframe type. In that regard, the MAC merge sublayer 120 may generate a shortened version of MMH 640 for Mframes storing the start of an Ethernet frame, e.g., Mframe 220, 320, or 401. In this implementation, the shorted version of MMH 640 may, for example, include a 4 byte header with 3 bytes of preamble 641 followed by a preemptible indicator 642, where:

0x00 indicates start of a non-preemptible Mframe (e.g., storing DMLT);

0xAA indicates start of a preemptible Mframe; and

0xFF indicates start of a fragment header for a preemptible non-initial Mframe, e.g., storing fragment data not the initial fragment of data for a preempted Ethernet frame.

The MAC merge sublayer 120 may generate a lengthened version of the MMH 640 for preemptible non-initial Mframes. The lengthened version of the MMH 640 may additionally include an indication of a frame number, fragment number, or both, e.g., through the frame and fragment information field 643. In using the MMH 640, the MAC merge sublayer 120 may increment a frame count when preemption occurs during transmission of a preemptible Mframe. Put another way, the MAC merge sublayer 120 may increment the frame count when a preemptible Mframe is preempted, and may not increment the frame count when a preemptible Mframe is transmitted without fragmentation. The second fragment of a preempted frame may have a fragment number of 0x1, for example.

The MAC merge sublayer 120 may utilize a 4 byte MMH to increase efficiency, or use the 6 byte header to utilize the preamble space, or a mix of a shortened interpacket gap (IPG) and the preamble.

Figure 7:
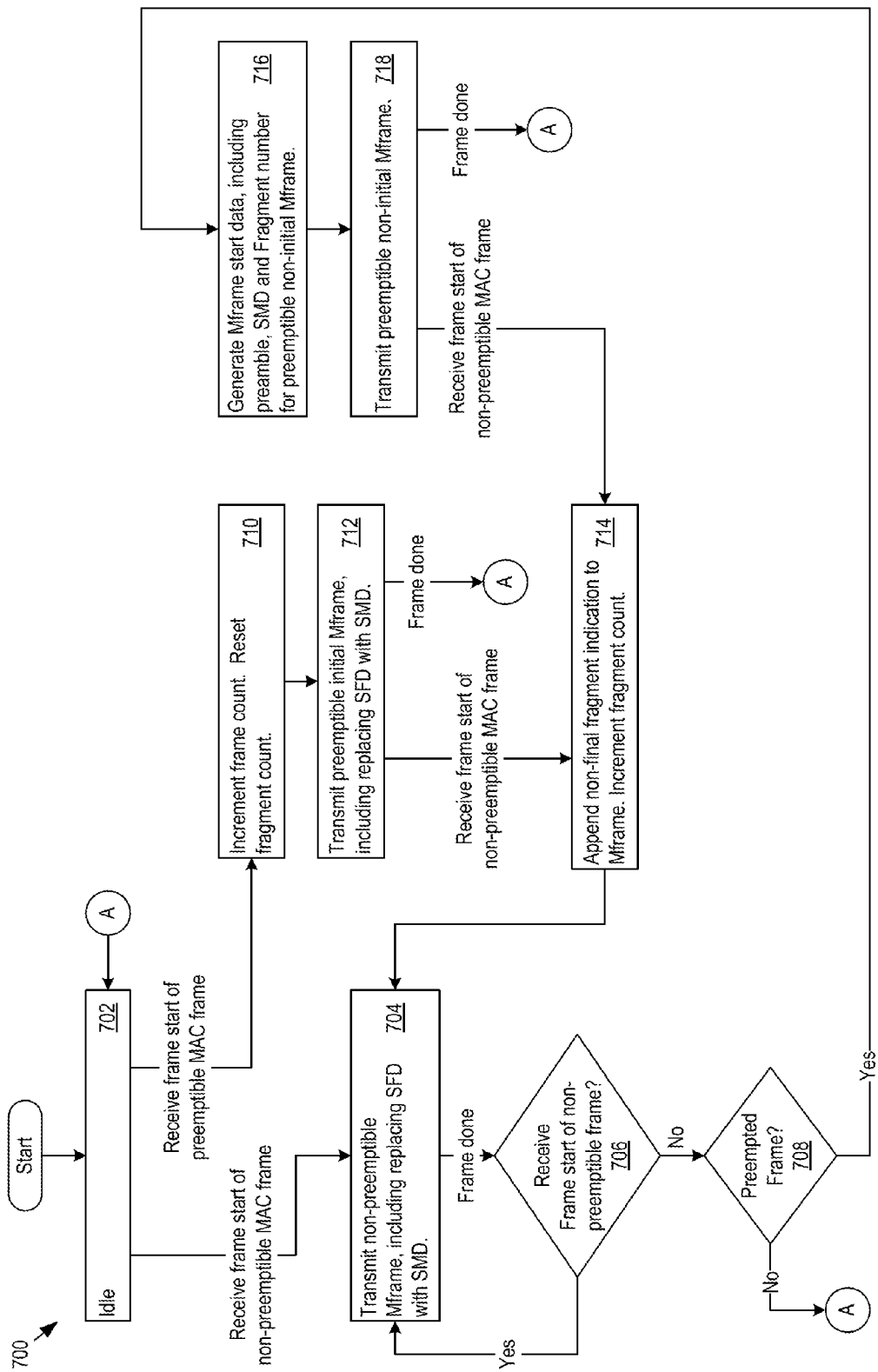
FIG. 7 shows an example of logic that the device may implement.

FIG. 7 shows an example of logic 700 that the device 100 may implement. For example, the device 100 may implement the logic 700 as the MAC merge sublayer 120, and in any combination of hardware, software, or firmware. The logic 700 may implement, for example, a state machine for controlling the functionality of the MAC merge sublayer 120. The device 100 may implement the logic 700 in hardware as the dedicated circuitry 140.

The MAC merge layer 120 may start or operate in an idle state (702), such as when the MAC merge layer 120 is not transmitting frame data to the PHY layer 130. The MAC merge sublayer 120 may obtain a frame start indication, which may include receiving the frame start of a data frame. The MAC merge sublayer 120 may determine whether the frame start indication corresponds to a preemptible data frame or a non-preemptible data frame, and the MAC merge sublayer 120 may make the preemptibility determination according to any number of criteria such as to traffic class (e.g., DMLT data vs. non-DMLT data), priority, quality of service, processing path or logic that supplied the frame start, or others. In the example shown in FIG. 7, the MAC merge sublayer 120 determines whether the frame start is for a preemptible or non-preemptible data frame according to a particular processing element (e.g., particular MAC logic 116) that the MAC merge sublayer 120 receives the frame start from.

The MAC merge sublayer 120 may receive the frame start of a non-preemptible data frame from a particular MAC logic 116 that processes non-preemptible data (which may be referred to as a non-preemptible MAC). In response, the MAC merge sublayer may transmit the frame data received from the non-preemptible MAC as a non-preemptible Mframe. The MAC merge sublayer 120 may receive frame data of the non-preemptible data frame from the non-preemptible MAC on a bit-by-bit basis. In that regard, the MAC merge sublayer 120 may encapsulate non-preemptible frame data on a bit-by-bit basis, including replacing a SFD data byte with an SMD data byte indicating the Mframe as non-preemptible (such as the SMD-DMLT value 221) while not altering other bits of the data frame. In this example, the MAC merge sublayer 120 may encapsulate and transmit the non-preemptible Mframe to the PHY layer 130 on a bit-by-bit basis.

The MAC merge sublayer 120 may complete transmission the frame data of the non-preemptible data frame through the non-preemptible Mframe, and determine whether a frame start for another (e.g., next or subsequent) non-preemptible data frame was received from the non-preemptible MAC during transmission (706). If so, the MAC merge sublayer 120 may transmit the frame data for the next or subsequent non-preemptible data frame, e.g., as described above (704). If not, the MAC merge sublayer 120 may determine whether transmission of a non-preemptible Mframe preempted an in-progress transmission of frame data for a non-preemptible data frame (708). If not, the MAC merge sublayer 120 may return to an idle state (702).

In the idle state, the MAC merge sublayer 120 may receive a frame start of a preemptible data frame from a particular MAC logic 116 that processes preemptible data (which may be referred to as a preemptible MAC). In response, the MAC merge sublayer 120 may transmit frame data of the preemptible data frame in one or more preemptible Mframes. Upon receiving the frame start from a preemptible MAC, The MAC merge sublayer 120 may increment the frame count (710) which may indicate transmission of frame data from a new or different preemptible data frame than previously transmitted. The MAC merge sublayer 120 may also reset the fragment count (710). Then, the MAC merge sublayer 120 may transmit a preemptible initial Mframe (712). The MAC merge sublayer 120 may receive and encapsulate frame data of the preemptible frame from the non-preemptible MAC on a bit-by-bit basis, including replacing a SFD data byte with an SMD data byte indicating the Mframe as an preemptible initial Mframe (such as the SMD-PRE value 312). The MAC merge sublayer 120 may continue to receive frame data of the preemptible data frame and transmit the preemptible initial Mframe on a bit-by-bit basis until completing transmission of the frame data or until determining to preempt transmission, e.g. in response to receiving the frame start of a non-preemptible data frame from a non-preemptible MAC.

When the MAC merge sublayer 120 completes transmission of the preemptible initial Mframe without interruption or preemption, the MAC merge sublayer 120 may return to an idle state (702). When the MAC merge sublayer 120 determines to preempt transmission of the frame data of the preemptible data frame, the MAC merge sublayer 120 may stop transmission of the frame data for the preemptible data frame and append a non-final fragment indication to the preemptible Mframe (714), e.g., the preemptible initial Mframe.

The MAC merge sublayer 120 may append the non-final fragment indication by transmitting the non-final fragment indication with (e.g., following) the transmitted portion (or fragment) of the frame data sent through the preemptible initial Mframe. The non-final fragment indication may be a function of a CRC value, e.g., a running or intermediate CRC value maintained by the MAC merge sublayer 120 and calculated from the previously transmitted fragment of the frame data. The CRC value may apply to some or all of the previously transmitted data of the preemptible data frame, and the MAC merge sublayer 120 may generate an altered intermediate CRC value, e.g., through inverting a selected portion of the CRC value, such as the last two bytes. The MAC merge sublayer 120 may generate the altered intermediate CRC value to result in particular calculated CRC value by a receiving device (e.g., 0x00FF) or particular difference from the calculated CRC value of the Ethernet frame with the FCS. In that regard, the MAC merge sublayer 120 may encapsulate the fragment of preemptible frame data transmitted with the non-final fragment indication and complete transmission of the preemptible initial Mframe. The MAC merge sublayer 120 may also increment the fragment count (714).

After appending the non-final fragment indication, the MAC merge sublayer 120 may transmit one or more non-preemptible Mframes (704 and 706) and upon completion, determine that transmission of a non-preemptible Mframe preempted transmission of frame data from a preemptible data frame (708). In response, the MAC merge sublayer 120 may resume transmission of the frame data of the preemptible data frame previously interrupted through preemption. The MAC merge sublayer may generate Mframe start data for a preemptible non-initial Mframe, which may include an Mframe preamble 421, SMD data (e.g., SMD-Non-Init value 422), and a fragment count value 423 (716). The MAC merge sublayer 120 may transmit the preemptible non-initial Mframe (718) by transmitting the Mframe start data followed by frame data from the preemptible data, resuming from the previous cut-off point.

While receiving and transmitting frame data for the preemptible data frame, the MAC merge sublayer 120 may determine to preempt transmission of the preemptible non-initial Mframe in response to receiving the frame start of a non-preemptible data frame from the non-preemptible MAC. In that case, the MAC merge sublayer 120 may append the non-final final fragment indication (714) to the preemptible non-initial Mframe. The MAC merge sublayer 120 may alter the running CRC value for previously transmitted frame data of the preemptible data frame, which may include multiple transmitted data fragments through the preemptible initial Mframe and one or more preemptible non-initial Mframes. The MAC merge sublayer 120 may append (e.g., transmit) the non-final fragment indication to complete transmission of the preemptible non-initial Mframe. After transmitting the non-preemptible Mframe (704), the MAC merge sublayer 120 may resume transmission of the preempted frame (716 and 718) until completing transmission of frame data for the preemptible data frame. Then, the MAC merge sublayer 120 may return to the idle state (702).

In one implementation, the device 100 and/or MAC merge sublayer 120 is implemented such that preempted fragment sizes (e.g., data fragments of a preempted Ethernet frame) are no smaller than a preemption size threshold. One example of a preemption size threshold is 64 bytes, and the MAC merge sublayer 120 may ensure data fragments are aligned, e.g., 8, 32 or 64 bit aligned, with the final data fragment of a preempted Ethernet frame being one possible exception. The device 100 and or MAC merge sublayer 120 may not (e.g., forego) preempting packets/frames that are smaller in size than a preemption packet threshold, such as frames that are less than 127 bytes.

The methods, devices, and logic described above, including the MAC merge sublayer 120, may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

In some implementations, the same hardware may be provided for generating the fragment CRC values and the final CRC value at the transmitter, and for checking the CRC values at the receiver. That is, while the CRC value may be applicable to a fragment of frame data, the CRC value may also be determined for and be applicable to the concatenation of the frame data that has been previously transmitted in the fragments up to and including the current fragment.

Various implementations have been specifically described. However, many other implementations are also possible.

What is claimed is:

1. A method comprising:
   in a network device:
   obtaining frame data;
   encapsulating the frame data by:
   adding an encapsulation element to the frame data by replacing a pre-existing portion of the frame data with the encapsulation element, the encapsulation element including a frame number and a fragment indicator indicating whether the frame data comprises an initial fragment or a non-initial fragment, and the encapsulation element indicating whether or not transmission of the frame data may be pre-empted; and
   transmitting the frame data encapsulated with the encapsulation element.

2. The method of claim 1, wherein:
   obtaining the frame data comprises obtaining an Ethernet frame; and
   adding the encapsulation element comprises replacing a start frame delimiter of the Ethernet frame with the encapsulation element.

3. The method of claim 1, further comprising:
   determining to preempt transmission of the frame data after transmitting the encapsulation element and a fragment of the frame data;
   accessing error checking data for the fragment of the frame data;
   altering a selected portion of the error checking data to obtain altered error checking data; and
   transmitting the altered error checking data as a non-final fragment indication following the fragment of the frame data.

4. The method of claim 3, wherein:
   accessing the error checking data comprises accessing a cyclic redundancy check (CRC) value applicable to the fragment of the frame data; and
   altering the selected portion of the error checking data comprises inverting a selected portion of the CRC value.

5. The method of claim 1, wherein encapsulating the frame data further comprises:
   adding error checking data to the frame data, the error checking data for verifying integrity of the encapsulation element.

6. The method of claim 1, further comprising:
   preempting transmission of the frame data after transmitting the encapsulation element and a first fragment of the frame data, and after transmitting the first fragment:
   encapsulating a subsequent fragment of the frame data by:

generating a frame header for the subsequent fragment of the frame data that includes a fragment preamble, a first subsequent encapsulation element indicating the subsequent fragment comprises non-initial fragment data of the frame data, and a second subsequent encapsulation element indicating a fragment count value; and transmitting the subsequent fragment of the frame data with the frame header.

7. The method of claim 6, wherein generating comprises generating the frame header so the first subsequent encapsulation element further indicates another frame number associated with the subsequent fragment.

8. The method of claim 6, wherein generating comprises generating the frame header to further include error checking data applicable to the first subsequent encapsulation element, the second subsequent encapsulation element, or both.

9. The method of claim 6, further comprising:
determining to preempt transmission of the frame data while transmitting the subsequent fragment of the frame data; and
accessing error checking data for both the first fragment and the subsequent fragment of the frame data;
altering a selected portion of the error checking data to obtain altered error checking data; and
transmitting the altered error checking data as a non-final fragment indication following the subsequent fragment of the frame data.

10. The method of claim 1, where adding the encapsulation element to the frame data comprises:
accessing values for the encapsulation element, the values differing by a particular hamming distance; and
selecting one of the values to add as the encapsulation element.

11. The method of claim 1, wherein encapsulating the frame data comprises encapsulating the frame data without increasing an amount of data to transmit as the frame data encapsulated with the encapsulation element.

12. A system comprising:
a communication interface; and
encapsulation circuitry in communication with the communication interface, the encapsulation circuitry configured to:
obtain an Ethernet frame;
determine whether the Ethernet frame comprises preemptible or non-preemptible data;
determine an encapsulation element value for the Ethernet frame based on whether the Ethernet frame comprises preemptible or non-preemptible data;
include in the encapsulation element value a frame number and a fragment indicator indicating whether the data of the Ethernet frame comprises an initial fragment or a non-initial fragment;
add the encapsulation element value to the Ethernet frame by replacement of a start frame delimiter of the Ethernet frame with the encapsulation element; and
transmit the Ethernet frame with the encapsulation element value through the communication interface.

13. The system of claim 12, where the encapsulation circuitry is configured to determine the Ethernet frame comprises non-preemptible data when the Ethernet frame includes data above a pre-determined priority threshold.

14. The system of claim 12, where the encapsulation circuitry is further configured to:
determine to preempt transmission of the Ethernet frame after transmitting a first fragment of the Ethernet frame with the encapsulation element; and
accessing error checking data for the first fragment of the Ethernet frame;
altering a selected portion of the error checking data to obtain altered error checking data; and
transmitting the altered error checking data as a non-final fragment indication following the first fragment of the Ethernet frame.

15. A system comprising:
media access control (MAC) circuitry configured to process data at a data link layer of an Open Systems Interconnect (OSI) model;
physical (PHY) circuitry configured to process data at a physical layer of the OSI model; and
MAC merge circuitry in communication with the MAC circuitry and the PHY circuitry and configured to:
receive a MAC frame from the MAC circuitry;
encapsulate the MAC frame to generate an MAC merge frame (Mframe), by adding an encapsulation element to the MAC frame, the encapsulation element indicating whether the Mframe comprises preemptible frame data or non-preemptible frame data and the encapsulation element including a frame number and a fragment indicator indicating whether the Mframe comprises an initial fragment or a non-initial fragment; and
send the Mframe to the PHY circuitry for transmission.

16. The system of claim 15, wherein the MAC merge circuitry operates transparently to the PHY circuitry.

17. The system of claim 15, wherein the MAC merge circuitry is configured to add the encapsulation element to the MAC frame by replacing a portion of the MAC frame with the encapsulation element.

18. The system of claim 15, wherein the MAC merge circuitry is further configured to prempt transmission of a portion of the Mframe after transmission of a portion of the Mframe, encapsulate the prempted portion of the Mframe to generate another Mframe with the fragment indicator indicating the non-initial fragment, and transmit the prempted portion of the Mframe as the another Mframe.

19. The system of claim 18, wherein another Mframe comprises a plurality of another Mframes, and the MAC merge circuitry is further configured to generate a last another Mframe with the fragment indicator indicating a final fragment indication.

20. The system of claim 15, wherein the MAC merge circuitry is further configured to encapsulate the MAC frame to generate the Mframe without adding additional data to surround the Mframe.

* * * * *